United States Patent
Karp et al.

(10) Patent No.: US 12,168,175 B2
(45) Date of Patent: Dec. 17, 2024

(54) METHOD AND SYSTEM FOR AUTOMATICALLY CONTROLLING USER INTERRUPTION DURING GAME PLAY OF A VIDEO GAME

(71) Applicant: Sony Interactive Entertainment LLC, San Mateo, CA (US)

(72) Inventors: Sarah Karp, Foster City, CA (US); Kristie Ramirez, San Jose, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 145 days.

(21) Appl. No.: 17/826,983

(22) Filed: May 27, 2022

(65) Prior Publication Data

US 2023/0381649 A1    Nov. 30, 2023

(51) Int. Cl.
*A63F 13/28* (2014.01)
*A63F 13/212* (2014.01)
*A63F 13/537* (2014.01)
*G06N 3/08* (2023.01)

(52) U.S. Cl.
CPC .......... *A63F 13/537* (2014.09); *A63F 13/212* (2014.09); *G06N 3/08* (2013.01); *A63F 2300/1012* (2013.01)

(58) Field of Classification Search
CPC .......... A63F 13/28; A63F 13/40; A63F 13/45; A63F 13/50; A63F 13/53; A63F 13/537; A63F 13/60; A63F 13/79; A63F 2300/30; A63F 2300/301; A63F 2300/303
See application file for complete search history.

(56) References Cited

U.S. PATENT DOCUMENTS

| | | | |
|---|---|---|---|
| 5,772,508 A | 6/1998 | Sugita et al. | |
| 2011/0143838 A1 | 6/2011 | Lee et al. | |
| 2014/0364215 A1* | 12/2014 | Mikhailov | A63F 13/212 |
| | | | 463/31 |
| 2017/0045942 A1 | 2/2017 | Bostick et al. | |

(Continued)

FOREIGN PATENT DOCUMENTS

| | | |
|---|---|---|
| KR | 20130074459 A | 7/2013 |
| KR | 20200017326 A | 2/2020 |

OTHER PUBLICATIONS

Intl Search & Written Opinion PCT/US2023/067417, dated Aug. 18, 2023, total 11 pages.

*Primary Examiner* — Omkar A Deodhar
(74) *Attorney, Agent, or Firm* — PENILLA IP, APC

(57) ABSTRACT

A method for gaming including generating game state data during execution of a video game for a game play of a player. The method includes determining a gaming context of a current point in the game play based on the game state data. The method includes inputting the game state data and the gaming context to an artificial intelligence (AI) model trained to identify one or more levels of user immersion defining user engagement with the video game. The method includes using the AI model to determine a level of user immersion for gaming for the current point in the game play, wherein the level of immersion exceeds a threshold indicating that the player is highly engaged with the video game. The method includes automatically generating an indicator that is presented to an environment surrounding the player, wherein the indicator provides notification that the player should not be interrupted.

20 Claims, 7 Drawing Sheets

(56) References Cited

U.S. PATENT DOCUMENTS

| | | |
|---|---|---|
| 2020/0298100 A1 | 9/2020 | Ambinder et al. |
| 2021/0312717 A1 | 10/2021 | Mao |
| 2021/0327214 A1 | 10/2021 | Aurich et al. |
| 2021/0394073 A1 | 12/2021 | Osman et al. |
| 2021/0400142 A1* | 12/2021 | Jorasch ................ H04N 7/147 |
| 2021/0402292 A1 | 12/2021 | Chow |
| 2022/0312071 A1* | 9/2022 | Devaraj ........... H04N 21/44218 |
| 2023/0030262 A1* | 2/2023 | Springer ................ H04L 67/55 |

* cited by examiner

METHOD AND SYSTEM FOR AUTOMATICALLY CONTROLLING USER INTERRUPTION DURING GAME PLAY OF A VIDEO GAME

TECHNICAL FIELD

The present disclosure is related to gaming, and more specifically to the classification of levels of intensity or immersion within a game play of a player when playing a video game using artificial intelligence to identify periods when the player should not be disturbed during game play of the video game.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop computers, laptop computers, mobile phones, etc.

During gameplay, users can become very immersed in their gaming activity. Sometimes, their gaming activity can take hours and their concentration level may be very high for one or more periods, wherein the periods may be of varying duration ranging from very short periods to very long periods of time. In other cases, gaming activity can be more relaxed and entertaining. However, during the gaming activity, a user that is highly engaged and immersed when playing a video game will not be pleased if they were interrupted by a person wanting to talk, walking up to them to talk, or by a communication from another user device (e.g., phone call, notification, email, message). In those cases, the interruption may negatively affect the game play of the user (e.g., fail the current task).

It is in this context that embodiments of the disclosure arise.

SUMMARY

Embodiments of the present disclosure relate to systems and methods for training and implementing an artificial intelligence (AI) model that is configured to determine a level of immersion of a player during game play of a video game. In that manner, when the player is highly immersed in the game play, a notification to the surrounding environment may be presented indicating that the player should not be interrupted. As such, the player is able fully concentrate on playing the game without interruption. Also, when the player is not highly immersed in the game play, another notification may be presented indicating that the player can be interrupted, such as when the player is playing in a relaxed mode and is more easily able to handle both communication with another person as well as continuing playing the video game.

In one embodiment, a method for gaming is disclosed. The method including generating game state data during execution of a video game for a game play of a player. The method including determining a gaming context of a current point in the game play based on the game state data. The method including providing as input the game state data and the gaming context to an artificial intelligence (AI) model trained to identify one or more levels of user immersion defining user engagement with the video game. The method including using the AI model to determine a level of user immersion for gaming for the current point in the game play, wherein the level of immersion exceeds a threshold indicating that the player is highly engaged with the video game. The method including automatically generating an indicator that is presented to a physical environment surrounding the player, wherein the indicator provides notification that the player should not be interrupted.

In another embodiment, a non-transitory computer-readable medium storing a computer program for implementing a method for gaming is disclosed. The computer-readable medium including program instructions for generating game state data during execution of a video game for a game play of a player. The computer-readable medium including program instructions for determining a gaming context of a current point in the game play based on the game state data. The computer-readable medium including program instructions for providing as input the game state data and the gaming context to an artificial intelligence (AI) model trained to identify one or more levels of user immersion defining user engagement with the video game. The computer-readable medium including program instructions for using the AI model to determine a level of user immersion for gaming for the current point in the game play, wherein the level of immersion exceeds a threshold indicating that the player is highly engaged with the video game. The computer-readable medium including program instructions for automatically generating an indicator that is presented to a physical environment surrounding the player, wherein the indicator provides notification that the player should not be interrupted.

In still another embodiment, a computer system is disclosed, wherein the computer system includes a processor and memory coupled to the processor and having stored therein instructions that, if executed by the computer system, cause the computer system to execute a method for gaming. The method including generating game state data during execution of a video game for a game play of a player. The method including determining a gaming context of a current point in the game play based on the game state data. The method including providing as input the game state data and the gaming context to an artificial intelligence (AI) model trained to identify one or more levels of user immersion defining user engagement with the video game. The method including using the AI model to determine a level of user immersion for gaming for the current point in the game play, wherein the level of immersion exceeds a threshold indicating that the player is highly engaged with the video game. The method including automatically generating an indicator that is presented to a physical environment surrounding the player, wherein the indicator provides notification that the player should not be interrupted.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
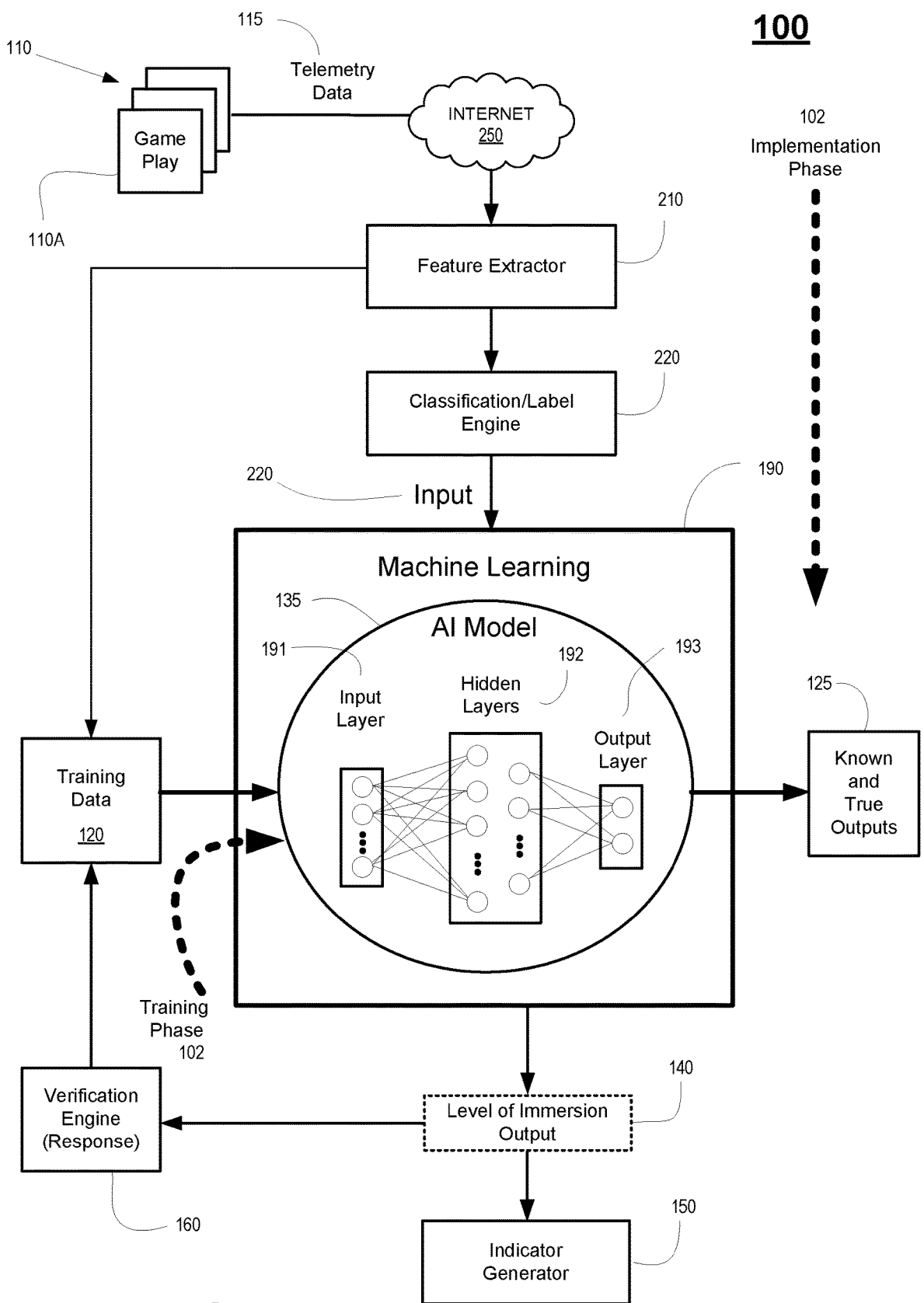
FIG. 1 illustrates a system configured to implement an artificial intelligence model that is configured, in part, to determine a level of immersion of a player during game play of a video game, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing artificial intelligence (AI) techniques to train and/or build a machine learning model configured to determine a level of immersion of a player during game play of a video game. In that manner, when the player is highly immersed in the game play, a notification to the surrounding environment may be presented indicating that the player should not be interrupted. In particular, during game play, players can become very immersed in their gaming activity. Sometimes, their gaming activity can take hours and their concentration level is very high. In other cases, gaming activity can be more relaxed and entertaining. Depending on the context of the game play of different video games and gaming environments, a player's level of immersion in the corresponding game play may vary. In one embodiment, a method is disclosed for detecting the level of immersion and the related context of the current game and also taking into account player characteristics during the game play of a player. If the player is determined to be in an immersive state, the game system will automatically generate an indicator to notify others that the player is currently very immersed and should not be interrupted. Utilizing this automatic notification, a player does not have to stop gameplay or immersion to notify others. In one embodiment, the indicator can be in the form of a light that lights up on a controller, on HMD, on a peripheral device, on a game console, or a sound that is audible by people/pets other than the player. For example, a light can glow on the controller when the user is in an intense place in the game, or a light can be one on the headset, on the HMD, on glasses. In another embodiment, a message can be digitally shown on the outside of the HMD glass to inform other users not to bother the game at that time. In another embodiment, a setting, or indicator may be set by the game, to notify other users or persons nearby to not interrupt user Advantages of the methods and systems configured to implement AI techniques to train and/or build a machine learning model configured to determine a level of immersion of a player during game play of a video game include providing gaming systems that enable players to play video games without interruption during crucial moments in the game play that are important to the player. As such, instead of having the player break concentration to notify others that they should not presently disturb the player, automatic notification is provided to anyone in the surrounding environment that the player should not be interrupted. Also, automatic notification may be provided to others in the surrounding environment that the player is in a more relaxed mode, and can be interrupted (e.g., is available for engaging in communication during the game play). In that manner, the user's enjoyment of the video game is enhanced in all periods to include periods where the player is highly immersed in the game play and periods where the player is more relaxed in the game play.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

With the above general understanding of the various embodiments, example details of the embodiments will now be described with reference to the various drawings.

FIG. 1 illustrates a system 100 configured to implement an artificial intelligence model that is configured, in part, to determine a level of immersion of a player (e.g., through application of machine learning) during game play of a video game, in accordance with one embodiment of the disclosure. The system may be implemented during game play of a player to determine a current level of immersion of the player. In addition, the system may be implemented during one or more game plays of the player for one or more video games to train the AI model 135. As such, FIG. 1 is an illustration of a training phase and an implementation phase of the AI model 135 that is configured, in part, to classify and/or determine a level of immersion of a player during game play of a video game.

In particular, levels of immersion of the player may be classified using the AI model 135, also referred to as an AI learning model. The AI model is updateable by providing feedback and/or trusted data to continually train the AI model. In one embodiment, the AI learning model is a machine learning model configured to apply machine learning to classify levels of immersion in a game play of a specific player. In another embodiment, the AI learning model is a deep learning model configured to apply deep learning to classify levels of immersion of the player during game play, wherein machine learning is a sub-class of artificial intelligence, and deep learning is a sub-class of machine learning. As such, artificial intelligence is used to classify a player's levels of immersion during game play of a video game.

As shown, the AI model 135 may be configured for a training phase (e.g., horizontal direction through the AI model 135 to learn levels of immersion in game plays 110 of the player in one or more video games), or for an implementation phase (e.g., vertical direction through the AI model to determine a current level of immersion during a current game play 110A of a video game by the player). For example, the AI model 135 can be configured to monitor gaming session activity in order to provide input into the AI model for learning levels of immersion for the player during various game contexts of game plays 110 of one or more video games and based on user data (e.g., biometric, motion, emotion, data). As such, the AI model 135 is personalized to the player. For example, one player may have difficulty beating a boss in any game because of low skill level and requires high immersion in the game play when engaged with a boss. On the other hand, another player in the same gaming context (beating a boss) may be highly skilled and find that when beating any boss in any game does not require high levels of immersion (i.e., relaxed gaming).

During the training phase, telemetry data 115 is collected from a plurality of game plays 110 of the player playing one or more video games. Telemetry data (or state data) may include game state data, user saved data, and metadata. Other data may include information about the player, such as biometric data, or motion data, or controller motion data that may indicate a particular emotion of the user (e.g., determine when the user is intense, or when the user is concentrating, etc.). Specifically, game state data defines the state of the game play of an executing video game for a player at a particular point in time. Game state data allows for the generation of the gaming environment at the corresponding point in the game play. For example, game state data may include states of devices used for rending the game play (e.g., states of the CPU, GPU, memory, register values, etc.), identification of the executable code to execute the video game at that point, game characters, game objects, object and/or game attributes, graphic overlays, and other information. User saved data includes information that personalizes the video game for the corresponding player. For example, user saved data may include character information and/or attributes that are personalized to a player (e.g., location, shape, look, clothing, weaponry, assets, etc.) in order to generate a character and character state that is unique to the player for the point in the game play, game attributes for the player (e.g., game difficulty selected, game level, character attributes, character location, number of lives, trophies, achievements, rewards, etc.), user profile data, and other information. Metadata is configured to provide relational information and/or context for other information, such as the game state data and the user saved data. For example, metadata may include information describing the gaming context of a particular point in the game play of a player, such as where in the game the player is, type of game, mood of the game, rating of game (e.g., maturity level), the number of other players there are in the gaming environment, game dimension displayed, the time of the collection of information, the types of information collected, region or location of the internet connection, which players are playing a particular gaming session, descriptive information, game title, game title version, franchise, format of game title distribution, network connectivity, downloadable content accessed, links, language, system requirements, hardware, credits, achievements, awards, trophies, and other information.

Streams of telemetry data may be collected via a network 250 when the video game is being executed locally at a client device of the player, or may be collected internally at a game cloud system that is configured to provide streaming services (e.g., cloud gaming) to the player. The telemetry is delivered to the feature extractor 210 that is configured to extract out the salient and/or relevant features from the telemetry data 115 that is useful in classifying levels of immersion in game plays of video games of the player. The feature extractor may be configured to define features that are associated with game contexts, controller inputs, skill level of the player, and other data (e.g., biometric data, motion data of objects held or worn by the player including a controller or HMD, etc.). In some implementations, both feature definition and extraction is performed by the AI model 135, such that feature learning and extraction is performed internally within the AI model. In addition, extracted features are classified or labeled by classification/label engine 220. In that manner, the extracted features can be classified and/or labeled (e.g., as gaming context data, user input data, user skill data, user behavior data, etc.). In another embodiment, the extraction and/or classification of features may be performed by the deep/machine learning engine 190. For example, feature extraction and/or classification of features are further described in relation to FIGS. 2A-2B.

As shown, the deep/machine learning engine 190 is configured for implementation to classify a level of immersion of a player for a game play of a video game (e.g., implementation phase) based on the input set of data (e.g., extracted features), but may also be configured for training in another phase (e.g., training phase) to classify a plurality of levels of immersion of the player for a plurality of game plays of a plurality of video games. In one embodiment, the AI model 160 is a machine learning model configured to apply machine learning to classify popularity trends of video games. In another embodiment, the AI learning model is a deep learning model configured to apply deep learning to classify popularity trends of video games, wherein machine learning is a sub-class of artificial intelligence, and deep learning is a sub-class of machine learning.

Purely for illustration, the deep/machine learning engine 190 may be configured as a neural network used to train and/or implement the AI model 135, in accordance with one embodiment of the disclosure. Generally, the neural network represents a network of interconnected nodes responding to input (e.g., extracted features) and generating an output (e.g., classify levels of immersion of a player during game play of video games). That is the AI model 135 is trained to learn characteristics of the player, such that at a current point in a game play of a video game the AI model is able to determine and/or classify a level of immersion in the game play by the player. In one implementation, the AI neural network includes a hierarchy of nodes. For example, there may be an input layer 191 of nodes, an output layer 193 of nodes, and intermediate or hidden layers 192 of nodes. Input nodes are interconnected to hidden nodes in the hidden layers, and hidden nodes are interconnected to output nodes. Interconnections between nodes may have numerical weights that may be used link multiple nodes together between an input and output, such as when defining rules of the AI model 135.

During the training phase, training data 120 (e.g., extracted features and/or classified features) may be provided as input to the machine learning system 190, which implements a training algorithm to fit the structure of the AI model 135 to the training data by tweaking the parameters of the AI model, so that the trained AI model provides an accurate relationship between input (training data) and output. Training and/or learning may be supervised using known and true outputs 125 (e.g., levels of immersion of the player for particular gaming contexts, etc.) associated with the training data 120. Training and/or learning may be unsupervised, wherein no known or true outputs are provided for the training data 120, such that input data is only provided and the AI model learns to determine to associate a level of immersion of the player for a given gaming context of any video game. Also, training may implement both supervised and unsupervised training. For example, after performing unsupervised training, supervised learning may be performed with known data. Training and implementation of the AI model 135 is further described below.

Specifically, machine learning engine 190 is configured to analyze training data 120 during the training phase to build (e.g., train through learning) the AI model 135. As such, the training data 120 are fed to the machine learning engine 190, which utilizes artificial intelligence, including supervised learning algorithms, unsupervised learning algorithms, reinforcement learning, or other artificial intelligence-based algorithms to build the AI model 135. Generally, the neural network in the machine learning engine 190 represents a network of interconnected nodes, such as an artificial neural network, and is used to train the AI model 135. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

In particular, the AI model 135 is configured to apply rules defining relationships between features and outputs (e.g., gaming contexts, user behavior, user data, etc.), wherein features may be defined within one or more nodes that are located at one or more hierarchical levels of the AI model 135. The rules link features (as defined by the nodes) between the layers of the hierarchy, such that a given input set of data leads to a particular output (e.g., level of immersion of the player during game play of a video game) of the AI model 135. For example, a rule may link (e.g., using relationship parameters including weights) one or more features or nodes throughout the AI model 135 (e.g., in the hierarchical levels) between an input and an output, such that one or more features make a rule that is learned through training of the AI model 135. That is, each feature may be linked with one or more features at other layers, wherein one or more relationship parameters (e.g., weights) define interconnections between features at other layers of the AI model 135. As such, each rule or set of rules corresponds to a classified output.

As such, the neural network in the machine learning engine 190 configured to build the AI model 135 may predict and/or classify levels of immersion of the player during game plays of one or more video games. Based on these predictive results, the neural network 190 is configured to define an AI model 135 that is used to predict levels of immersion for the player. As such, the resulting output 140 according to the rules of the AI model 135 may predict a level of immersion of a game play of the player for a video game based on the gaming context of the game play and other user related data.

In particular, during the implementation phase, the AI model 135 is used to predict and/or classify a level of immersion for a game play of a video game for a player at a particular point in time based on the configuration of the AI model 135. That is, for a given set of extracted features that is provided as input to the AI model 135, a level of immersion classification 140 is determined for a game play of a video game by the player and may be provided as an output by the AI model 135.

Further, the output (level of immersion classification 140) from AI model 135 may be used by the indicator generator 150 to determine an appropriate course of action for a given set of inputs (e.g., extracted features). For example, when the level of immersion exceeds a threshold indicating the player is highly immersed in the game play as determined by the generator 150, an indicator may be generated that provides notification (e.g., light signal, audio signal, message, etc.) to others that the player should not be interrupted.

In addition, the player may provide feedback during live game play as to the performance of the AI model 135, such as through the verification engine 160 (providing a feedback response). As such, feedback may be provided indicating that the predicted level of immersion for a given gaming context of a game play is correct or incorrect. The information provided as feedback may be newly included within the training data 120, and provided as input into the machine learning engine for purposes of updating the AI model 135. Because the information is verified (e.g., by the player), the machine learning engine could apply a supervised learning algorithm by assigning the verified output (e.g., predicted level of immersion 140) as being a true output 125 when updating the AI model, in one embodiment.

Figure 2A:
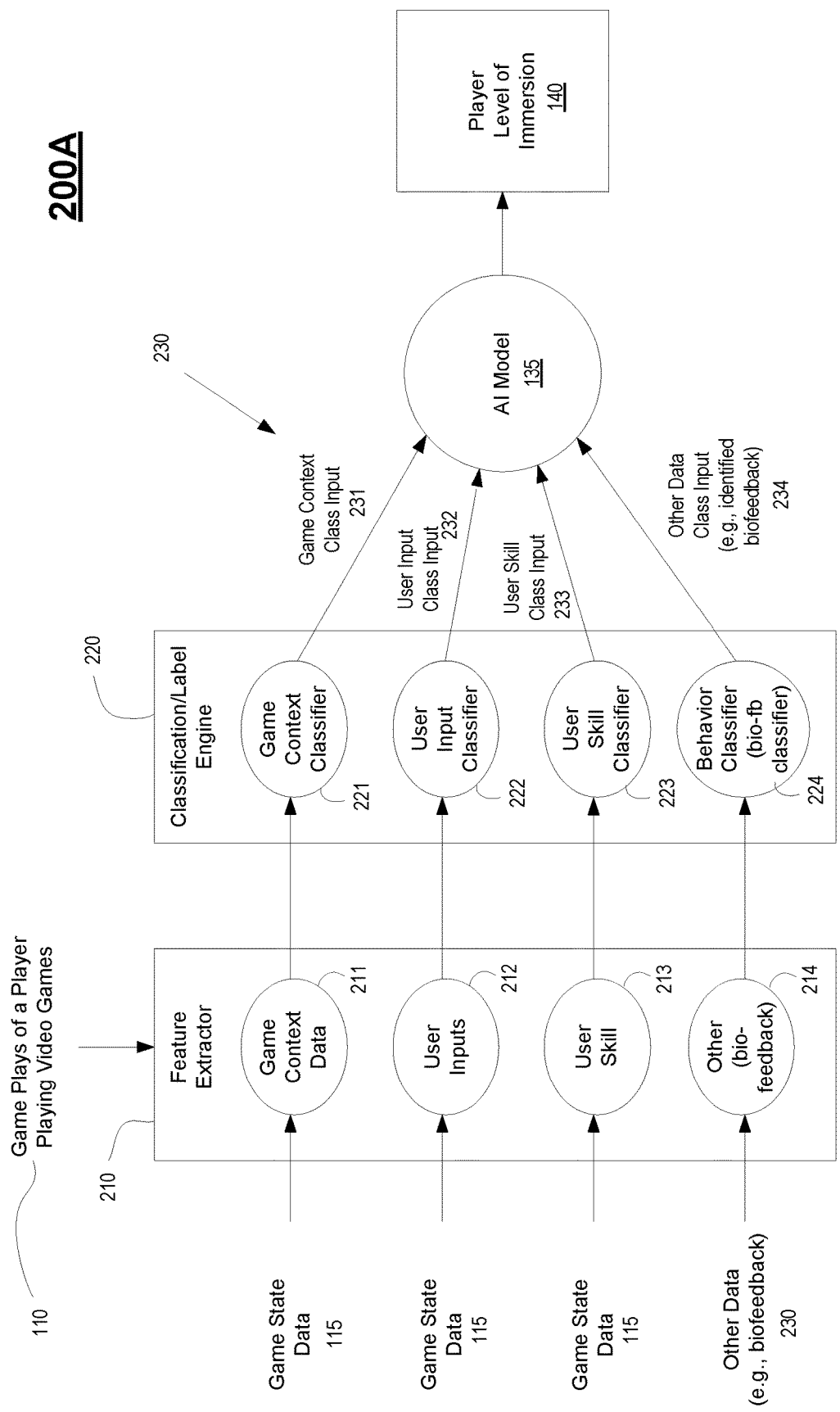
FIG. 2A is an illustration of a calibration/training phase and/or an implementation phase of an artificial intelligence model configured, in part, to determine a level of immersion of a player during game play of a video game, in accordance with one embodiment of the disclosure.

FIG. 2A is an illustration of a player intensity identifier 200A performing a training phase and/or an implementation phase of an artificial intelligence model 135 configured, in part, to determine a level of immersion of a player during game play of a video game, in accordance with one embodiment of the disclosure. In particular, player intensity identifier 200 may be executed to determine a level of immersion of the player during game play of a video game.

As shown, during a training phase of the AI model 135 of the identifier 200A, data is collected from a plurality of game plays 110 and provided to the feature extractor 210 in association with implementation of the machine learning engine 190. During an implementation phase of the AI model of the identifier 200A, data is collected from a current game play 110A, as is shown in FIG. 1. In particular, various data is provided to the feature extractor 210, including game state data 115 (e.g., used to define gaming context, user inputs, user skill level, etc.) and other data that may define user behavior (e.g., biofeedback data, or motion data of objects controlled by or worn by the player, such as hand controllers or HMD, etc.).

In particular, the feature extractor is able to extract relevant features useful in determining gaming context of game play, or player engagement with the video game during game play, etc. For example, the feature extractor 210 is able to extract game context data relevant for determining a gaming context of the game play of a video game, and user input data for controlling the game play, extract data relevant to or for determining the skill level of the player, and other data relevant for many other purposes including determining a behavior of the player (e.g., for determining whether the player is frustrated or highly engaged with the video game to include intense concentration). For example, other data may include biofeedback data (e.g., sweat, heart rate, brain activity, loudness of voice, etc.). Also, other data may include motion data of objects associated with the player, such as movement of controller or HMD. That motion data may indicate when the player is concentrating on the game play (e.g., relatively little motion or intense motion), or when the player is frustrated (e.g., moving controller in downward motion, or hanging the head and HMD, etc.).

In addition, classification/label engine 220 is configured to classify and/or label the extracted features. In particular, extracted features may be classified as gaming context data, or user input data, or user skill data, or other data (e.g., behavior data). In that manner, the classified data is provided as input to the AI model 135 for purposes of training or implementation, as previously described. For example, the game context classifier 221 provides classified game context data as input 231, and user input classifier 222 provides classified user input data (e.g., controller input) as input 232, and user skill classifier 223 provides classified user skill data as input 233, and user behavior classifier 224 provides classified other data (e.g., behavior data including biofeedback and motion data, etc.) as input 234.

In that manner, the AI model is executed to output a player level of immersion 140, during a training phase or implementation phase. In particular, during the implementation of the AI model 135, the output classifies a particular level of immersion for a particular gaming context that is personalized to the player. That is, the AI model 135 is able to classify a level of immersion of the player for a current game play of a video game.

Figure 2B:
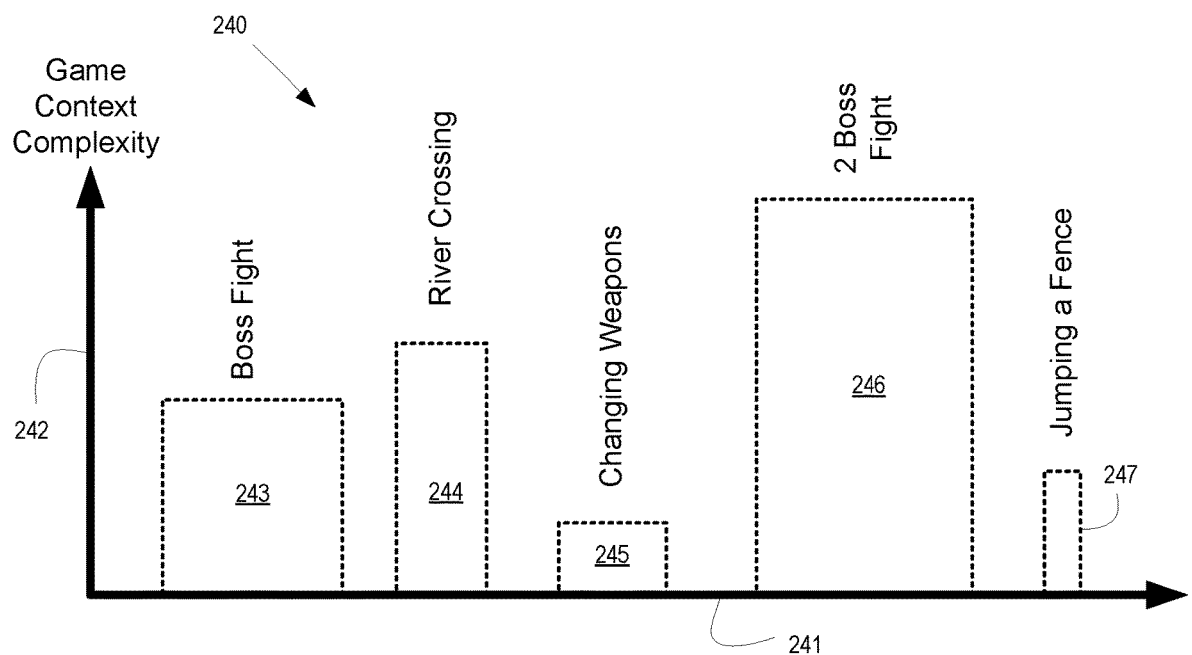
FIG. 2B is an illustration of various game contexts during a game play of a video game by a player and their related levels of immersion, in accordance with one embodiment of the disclosure.
Figure 2B:
Figure 2B:
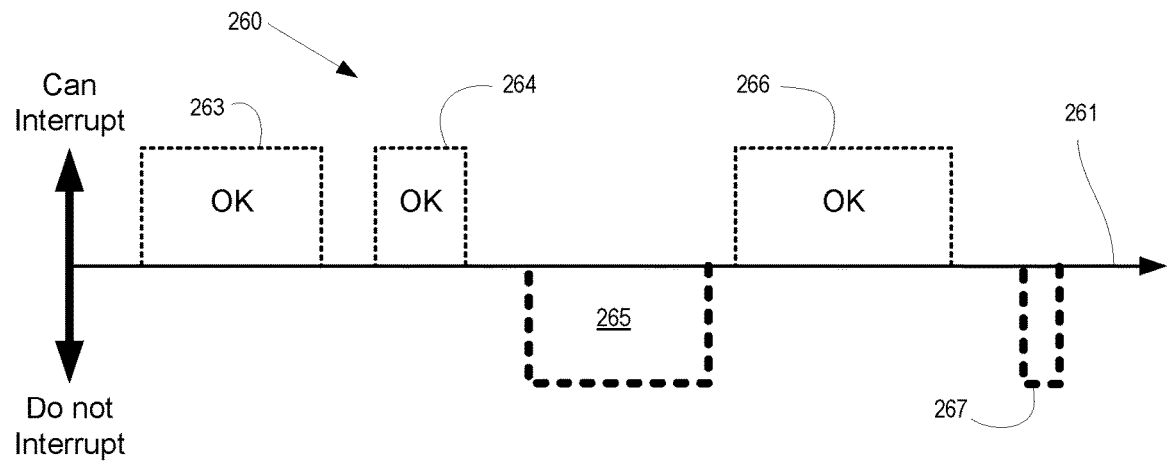

FIG. 2B is an illustration of various game contexts during a game play of a video game by a player and their related levels of immersion, in accordance with one embodiment of the disclosure. Gaming context for different players is important to determine levels of immersion. In particular, for a given gaming context (e.g., boss fight) a highly skilled player may not be highly immersed when engaging with the boss and may be peripherally communicating with others, whereas a beginning player may be highly immersed with the game play when fighting the boss. As such, levels of immersion are shown for varying gaming contexts for a particular player. In that manner, an indicator can be operated for example to indicate that the player should not be interrupted, such as when the player is highly engaged with the game play.

As shown, graph 240 illustrates varying gaming contexts that have been classified during game play of the player of a video game. The gaming contexts may occur at different times along a timeline 241 (e.g., x-axis) and of varying duration. In addition, a predefined level of complexity for the gaming context may be shown along vertical axis 242. For example, the level of complexity may be determined through analysis of game state data of a plurality of game plays of a plurality of players playing the video game. For example, this may be determined when corresponding AI models of a high number of players indicate that the level of immersion is high at the same point in the video game. In another case, the level of complexity may be defined by a game developer of the video game. It may be determined that a gaming context occurs at a predefined significant point in the video game.

In particular, various gaming contexts are shown in graph 240, including a boss fight gaming context 243, a river crossing gaming context 243 (i.e., crossing a river by a character controlled by the player), a changing weapons gaming context 245 (e.g., examining assets of the player for purposes of determining which weapons to actively carry), a double boss fight gaming context 246 (e.g., fighting two or more bosses), and a jumping a fence gaming context 247 (controlling a character to jump a fence).

Graph 250 illustrates predicted levels of immersion of the player during the game play of a video game for the gaming contexts shown in graph 240. The predicted levels of immersion are generated by the AI model 135 of FIGS. 1 and 2A. The predicted levels of immersion are aligned with the gaming contexts shown in graph 240, such that the timeline 251 of graph 250 is aligned with timeline 241 of graph 240. In particular, the predicted level of immersion is shown along vertical axis 252 (e.g., higher levels of immersion is shown further away from the timeline 251 or higher up the vertical axis 252). For example, the player may be highly skilled, and as such a predicted level of immersion 253 for the boss fight gaming context 243 is low. For example, the level of immersion 253 is below the threshold 259, wherein the threshold indicates that the player is highly engaged with the game play for levels of immersion above the threshold 259. Also, a predicted level of immersion 254 for the river crossing gaming context 243 is also quite low as the player is highly skilled. For example, the level of immersion 254 is below the threshold 259. Further, a predicted level of immersion 255 for the changing weapons gaming context 245 for this player may be very high, and is shown above threshold 259. For example, the player may intensely enjoy examining and changing weapons or assets of a character in all game plays of all video games (e.g., determining which weapons to carry looks or for gaming strategy). This may be different than for another player who may not enjoy changing weapons and merely views it as a distraction. Also, a predicted level of immersion 256 for the double boss fight gaming context 246 may also be low (i.e., falling below the threshold 259) because the player is highly skilled. In addition, a predicted level of immersion 257 for the jumping a fence gaming context 247 may be relatively high, and is shown exceeding the threshold 259. This may be because even though the player is highly skilled, that player may be encountering this fence, or this type of fence in this video game or in any video game for the first time, and as such needs total concentration to complete the task of scaling or jumping the fence.

Also shown is graph 260, which illustrates the operation of an indicator (e.g., audio source, light source, etc.). In particular, when the level of immersion for a corresponding gaming context exceeds the threshold 259 in graph 250, it is determined that the player is highly immersed in the game play of the video game, and as such an indicator can be generated notifying others not to interrupt the player. The operation of the indicator is aligned with the predicted levels of immersion shown in graph 250 and the corresponding gaming contexts shown in graph 240, such that the timeline 261 of graph 260 is aligned with timeline 251 of graph 250 which is further aligned with timeline 241 of graph 240. Also, the vertical axis shows when the player can be interrupted or not interrupted.

In particular, for the boss fight gaming context 243 since the predicted level of immersion 253 is below the threshold 259, the player is not highly immersed in the game play and can be interrupted (as shown by the OK block 263 rising from the timeline 261). Also, for the river crossing gaming context 243 since the predicted level of immersion 254 is below the threshold 259, the player is not highly immersed in the game play and can be interrupted (as shown by the OK block 264 rising from the timeline 261). On the other hand, for the changing weapons gaming context 245 since the predicted level of immersion 255 is above threshold 259, the player is highly immersed in the game play and should not be interrupted. This is shown by block 265 which falls below the timeline 261 indicating the indicator should be activated to notify others in the surrounding environment not to interrupt the player. Further, for the double boss fight gaming context 246 since the predicted level of immersion 256 is below the threshold 259, the player is not highly immersed in the game play and can be interrupted (as shown by the OK block 266 rising from the timeline 261). In addition, for the jumping a fence gaming context 247 since the predicted level of immersion 257 is above threshold 259, the player is highly immersed in the game play and should not be interrupted. This is shown by block 267 which falls below the timeline 261 indicating the indicator should be activated to notify others in the surrounding environment not to interrupt the player.

Figure 3:
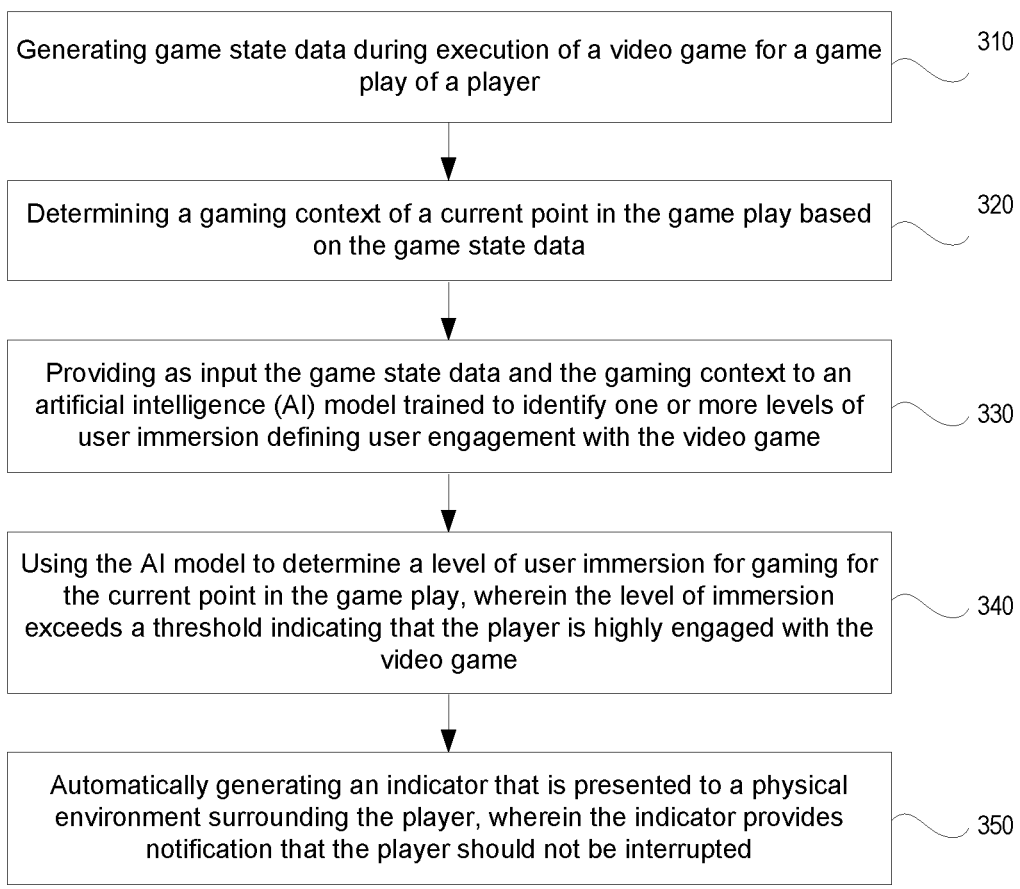
FIG. 3 is a flow diagram illustrating a method for gaming configured to determine a level of immersion of a player during game play of a video game and present notification to others in the surrounding environment indicating that the player should not be interrupted, in accordance with one embodiment of the disclosure.

With the detailed description of the system 100, player intensity identifier 200A, AI processor, machine learning engine 190, and AI model 135 of FIGS. 1 and 2A-2B, flow diagram 300 of FIG. 3 discloses a method for gaming that is configured to determine a level of immersion of a player during game play of a video game and present notification to others in the surrounding environment indicating that the player should not be interrupted, in accordance with one embodiment of the disclosure. The operations performed in flow diagram may be implemented by one or more of the entities previously described components, and also system 100 described in FIG. 1 that is configured to detect the level of immersion and the related context of the current game. In particular, process is executed as a background process during gaming, and the background process is configured to continuously analyze game state data to determine player immersion and identify corresponding context of gaming activities. If the player is determined to be in a highly immersive state, the game system will automatically generate an indicator to notify others that the player is currently very immersed and should not be interrupted. In that manner, when implementing this automatic notification, a player does not have to stop his or her game play or modify his or her immersion in the game play to notify others not to interrupt. In particular, the method 300 is performed in order to use machine learning to detect determine a level of immersion of the player during a game play of a video game based on game context and user information. The machine learning process can be executed in real time during gameplay, and can make adjustments based on the learned differences in the inputs provided by the current player.

At 310, the method includes generating and/or collecting game state data during execution of a video game for a game play of a player. As previously described, game state data defines the state of the game play for the player at a particular point. In that manner, the game state data allows for the generation of the gaming environment that exists at the corresponding point in the game play of the video game. The game state data may include controller input, user profile data or user data or user saved data configured to personalize the game, and metadata configured to provide information and/or context to other information, such as the game state data and the user saved data. Other data may be generated and/or collected, such as biometric data of the player, motion data of an HMD or controller, etc.

At 320, the method includes determining a gaming context of a current point in the game play based on the game state data. In particular, based on game state data from game plays of the player and other players (e.g., a plurality of players to include the player) playing the same video game that are collected and analyzed, gaming contexts throughout the video game may be defined. As such, the current gaming context of the game play of the player may be determined based on comparing the game state data of the current game play of the video game of the player and collected game state data and defined gaming contexts of the plurality of players.

At 330, the method includes providing as input the game state data and the gaming context to an AI model trained to identify one or more levels of user or player immersion defining user engagement with the video game, as previously described. Each player may have a corresponding AI model that is configured to recognize levels of immersion of the player when playing one or more video games. For instance, the AI model is able to determine a level of immersion during a current game play of a video game by the player. As such, the AI model is executed continuously to determine levels of immersion in the game play of the player. More particularly, at 340, the method includes using the AI model to determine a level of user immersion for gaming for the current point in the game play. In one implementation, the level of immersion is also determined to exceed a threshold indicating that the player is highly engaged with the video game. For example, levels of immersion exceeding the threshold indicate that the player is very immersed in the game play, whereas levels of immersion falling below the threshold indicate that the player is less immersed (e.g., requiring less concentration or intensity) in the game play.

At 350, the method includes automatically generating an indicator that is presented to a physical environment surrounding the player, wherein the indicator provides notification that the player should not be interrupted. That is, when the player is highly immersed in the game play, that player probably does not want to be disturbed for the period of time of high immersion. As such, once it is determined that the user is highly immersed in the game play of the video game, the indicator is generated and/or presented to the surrounding environment to notify others that the player is currently engaged in gaming during an intense period for the user and does not want to be interrupted. For example, the indicator may be a light source emitting light continuously of one or more colors, or emitting light in a pattern of various configurations (e.g., continuous or varying period lengths, etc.). In another example, the indicator may be an audio source (e.g., speaker) broadcasting an audio signal continuously at one or more intensities, or broadcasting the audio signal in a pattern of various configurations (e.g., continuous or varying period lengths, etc.). In addition, the audio signal may be a melody or tune of one or more notes. For example, the audio signal may be similar to the warning signal available at laboratories (e.g., laboratories involving radioactive materials).

The indicator (i.e., light, audio, etc.) may be located on or in association with the user, such as on an HMD worn by the player, or on a controller used by the player. For example, the controller may be configured to present a light cue or audio notification to others in the surrounding environment. In addition, the indicator may be located remote from the player, such as on a wall in a room occupied by the player, on nearby furniture (e.g., couch, seat, table, etc.), or on a stand-alone computer, or on a gaming console, etc. Also, the indicator may be configured within a dongle that can be powered and connected with a gaming console or computer associated with the game play of the video game.

In one embodiment, the method may be performed to determine when the level of immersion falls below the threshold. That is, it may be determined when the player comes out of the period of high immersion in the game play. In that manner, the functioning of the indicator may be terminated, such that the indicator is no longer providing notification that the player should not be interrupted. For example, the task (e.g., beating a boss, changing weapons or armor, etc.) being performed by the player has been completed, or the player may decide to quit performing the task. In that manner, others are aware that the player can be interrupted (e.g., for communication). In one embodiment, the indicator provides a second signal that is presented to the surrounding environment that the player can be interrupted. For example, a light indicator may glow in the color green, which may notify others that the player is not highly immersed in the game play and can be interrupted.

Figure 4A:
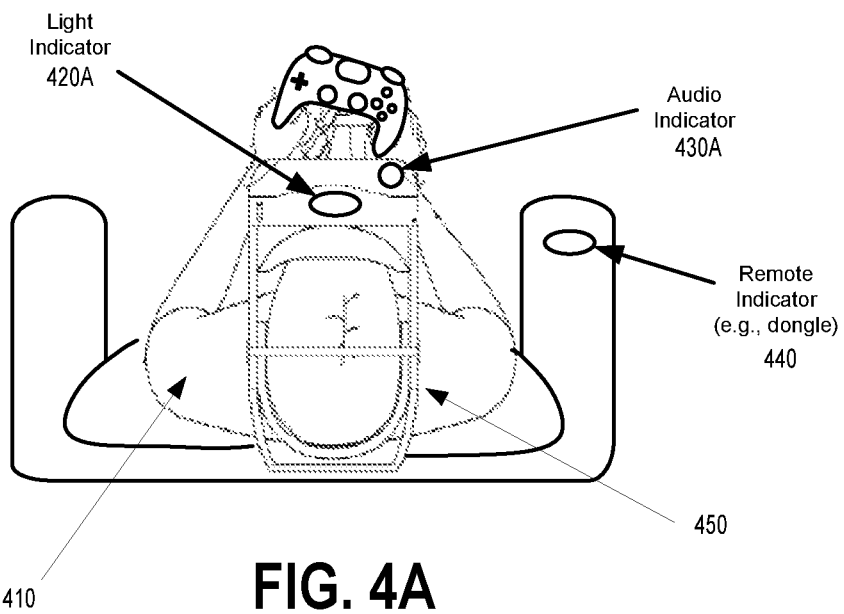
FIG. 4A is an illustration of one or more indicators providing audio or lighting notification indicating that a corresponding player should not be interrupted during game play of a video game, in accordance with one embodiment of the disclosure.

FIG. 4A is an illustration of one or more indicators providing audio or lighting notification indicating that a corresponding player should not be interrupted during game play of a video game, in accordance with one embodiment of the disclosure. As shown, user 410 is playing a video game while seated, wherein the game play is viewable through a head mounted display (HMD) 450. The HMD 450 is outfitted with one more indicators, wherein in one mode, the indicator is used to notify others in the surrounding environment that the player should not be interrupted as the player is highly immersed in the corresponding game play, and in another mode, the indicator is used to notify others that the player can be interrupted.

In particular, indicator 420A is located on HMD 450 and is configured to emit a light signal or light cue. For example, the indicator 420A may emit a continuous light, or flashing light of varying periods showing one or more colors. Also, HMD 450 includes indicator 430A that is configured to provide an audio notification. For example, the audio signal being broadcast may be configured with varying levels of sound over one or more periods, and may include periods of silence. In addition, the audio signal may broadcast a particular melody or tune. Further, the HMD may be configured to display a message as the indicator, such as on a visor.

In addition, the indicator may be located at a remote location that is remote from the player. For example, light 440 is positioned on an armrest of a couch that the player is sitting on. As another example, the light 440 may be positioned on a wall of the room in the surrounding environment, or on a table. In one implementation, the indicator is configured within a dongle. For example, the dongle may include a light source, or an audio source, as previously described. The dongle may be plugged into the gaming console, or standalone computer, or may be positioned independently.

Figure 4B:
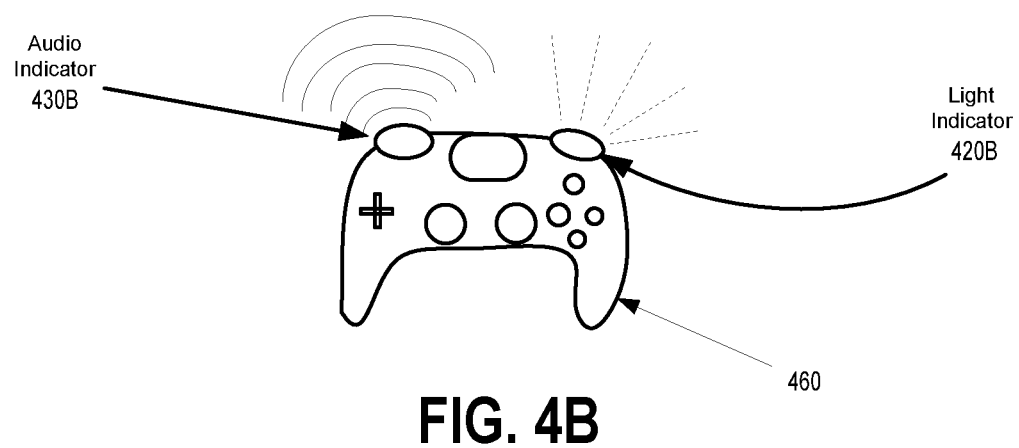
FIG. 4B is an illustration of a hand held controller including one or more indicators providing audio or lighting notification indicating that a corresponding player should not be interrupted during game play of a video game, in accordance with one embodiment of the disclosure.

FIG. 4B is an illustration of a hand held controller 460 including one or more indicators providing audio or lighting notification indicating that a corresponding player should not be interrupted during game play of a video game, in accordance with one embodiment of the disclosure. The controller is used by the player to provide input that directs the game play of the player.

In particular, controller 460 includes a light indicator 420B that is configured to emit a light cue notifying others that the player is highly immersed in the game play and should not be interrupted. The light cue may be of any configuration, such as a sequence of lights having one or more lengths of emission and using one or more colors. In one implementation, the light cue is a glowing light of a particular color.

Also, controller 460 includes an audio indicator 430B that is configured to provide audio notification that notifies others in the surrounding environment that the player is highly immersed in the game play and should not be interrupted. The audio signal being broadcast can be of various configurations, as previously described. For example, the audio signal may be a melody or tune that is immediately recognizable to warn others that the player should not be interrupted. In addition, the audio signal may have various volume levels.

Figure 4C:
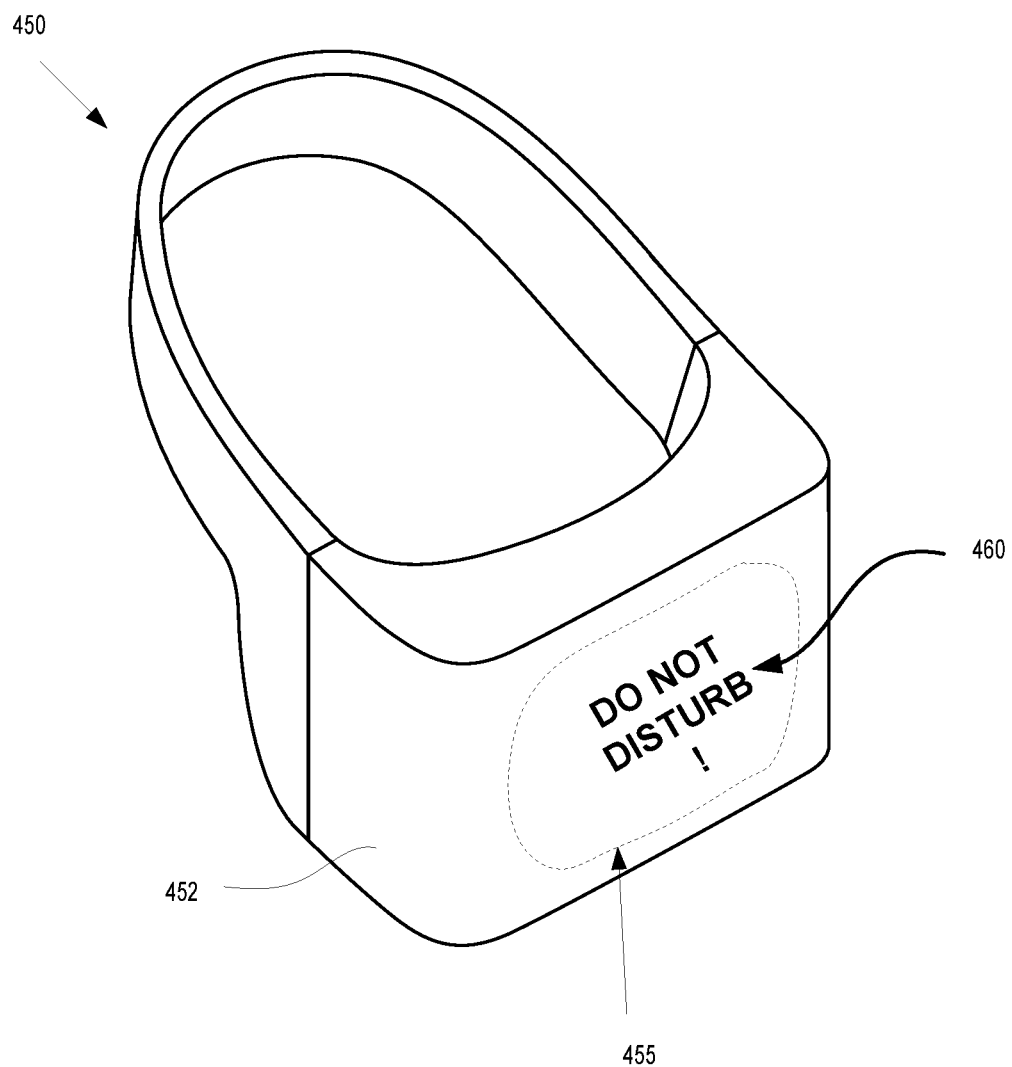
FIG. 4C is an illustration of a head mounted display including a message displayed on the outer surface of the display glass providing notification indicating that a corresponding player should not be interrupted during game play of a video game, in accordance with one embodiment of the disclosure.

FIG. 4C is an illustration of a head mounted display 450 worn by the player including a message 460 displayed on the outer surface 455 of the display glass providing notification indicating that a corresponding player should not be interrupted during game play of a video game, in accordance with one embodiment of the disclosure. The display glass may be located in a display housing 452 or visor of the HMD 450. As shown, the message 460 clearly indicates to anyone reading the message that the player should not be interrupted—i.e., "DO NOT DISTURB!".

In still another embodiment, a light cue may indicate that the player can be interrupted, as he or she is not highly immersed in the game play of the video game. For example, the AI model may determine that the level of immersion of the player is lower than a threshold. That is, the player is not highly engaged in the game play, which requires intense concentration and effort on the part of the player. For example, the player may be playing in a more relaxed mode and is willing and able to participate in communications with others or to be interrupted without sacrificing any pleasure in his or her game play. As such, the indicator may be configured to present another notification to the physical environment, wherein the another indicator provides notification that the player can be interrupted. For example, for a light cue, the indicator may glow in the color green, which may be universally recognized by others that the player can be interrupted.

In still another embodiment, when the AI model determines that the player is highly immersed in the game play of a video game, incoming communications with the player may be blocked. For example, the player may have services with a third party communicator (e.g., a gaming platform) that allows for communications between the player and other users. In that manner, the player may utilize a service that regulates communication with others while the player is actively engaged in gaming. As an illustration, a friend of the player may contact the third party communicator in an effort to communicate with the player (e.g., through voice, or message, or text, etc. communications), wherein the third party communicator may facilitate a communication path between a remote device of the friend and the player (e.g., via chat, messaging, voice, text, etc. communications). When the AI model determines that the player is highly immersed in game play, the third party communicator may be instructed to block incoming communications with the player.

Figure 5:
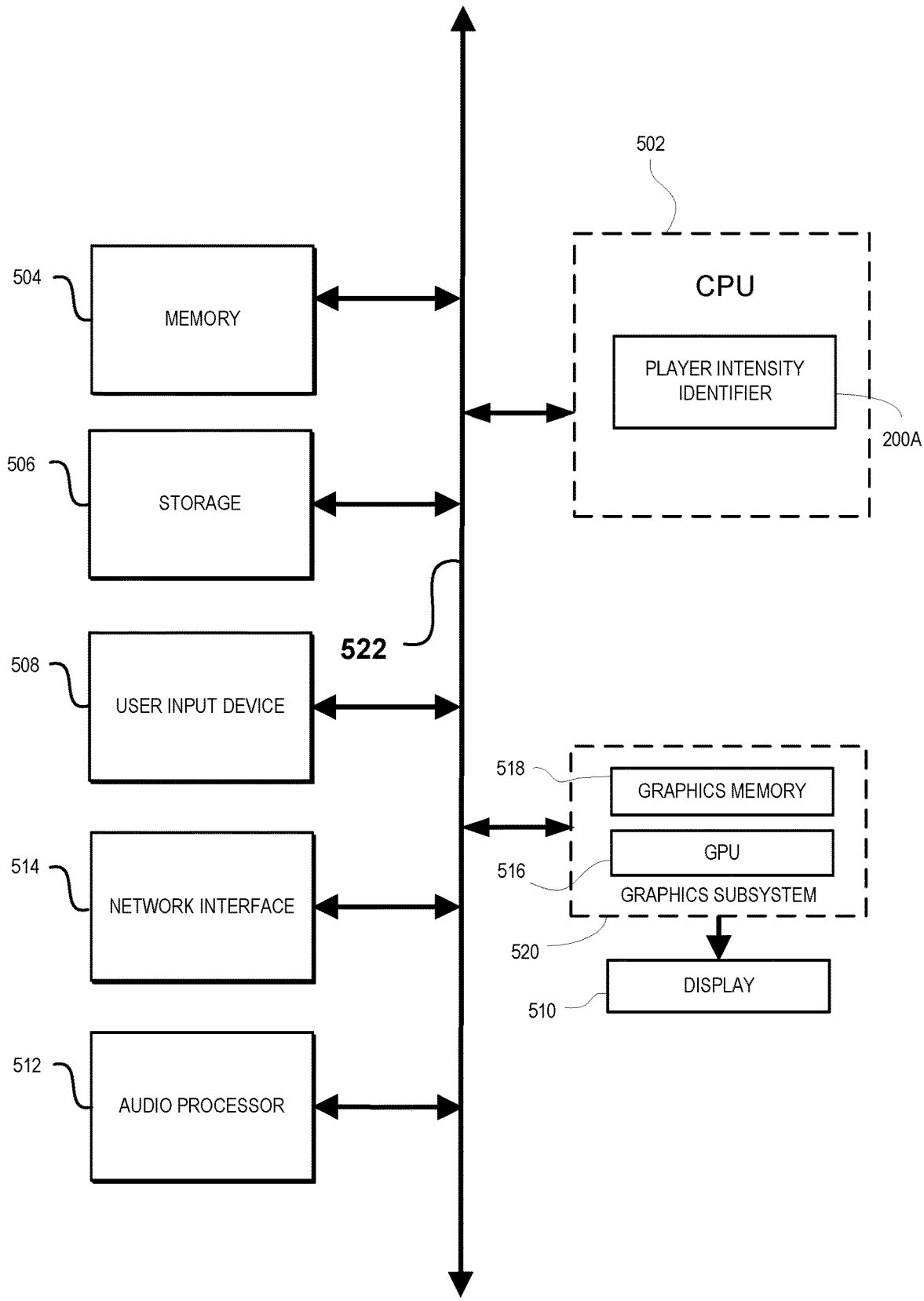
FIG. 5 illustrates components of an example device that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be a localized to a player playing a game segment (e.g., game console), or remote from the player (e.g., back-end server processor), or one of many servers using virtualization in a game cloud system for remote streaming of gameplay to clients.

CPU 502 may be configured to implement a player intensity identifier 200A configured to determine a level of immersion of a player during a game play of a video game. When it is identified that the player is highly immersed in the game play depending on the context of the game play, an indicator may be presented to the surrounding environment providing notification to others that the player should not be interrupted. In that manner, the player may concentrate on the game play without worrying about any distractions.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 508, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs. In one embodiment, GPU 516 may be implemented within an AI engine (e.g., machine learning engine 190) to provide additional processing power, such as for the AI, machine learning functionality, or deep learning functionality, etc.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

In other embodiments, the graphics subsystem 520 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for determining levels of immersion within a game play of a player when playing a video game using artificial intelligence to identify periods when the player should not be disturbed during game play of the video game.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include 5th Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for gaming, comprising:
generating game state data during execution of a video game for a game play of a player;
determining a gaming context of a current point in the game play based on the game state data;
providing as input the game state data and the gaming context to an artificial intelligence (AI) model trained to identify one or more levels of user immersion defining user engagement with the video game;
using the AI model to determine a level of user immersion for gaming for the current point in the game play, wherein the level of immersion exceeds a threshold indicating that the player is highly engaged with the video game, wherein the threshold is determined based on a skill level of the player and the gaming context; and
automatically generating an indicator that is presented to a physical environment surrounding the player, wherein the indicator provides notification that the player should not be interrupted.

2. The method of claim 1, further comprising:
collecting a plurality of game state data during a plurality of game plays of the player playing one or more video games; and
training the AI model based on the plurality of game state data to identify the one or more levels of user immersion of the player.

3. The method of claim 2, further comprising:
collecting biometric data related to the player during the plurality of game plays; and
training the AI model based on the biometric data.

4. The method of claim 1, further comprising:
providing as the indicator a light cue on a head mounted display (HMD) worn by the player.

5. The method of claim 1, further comprising:
providing as the indicator an audio notification.

6. The method of claim 1, further comprising:
providing as the indicator a light cue on a controller used by the player to provide controller input directing the game play of the player.

7. The method of claim 1, further comprising:
providing feedback to the AI model verifying whether the level of user immersion exceeds the threshold.

8. A non-transitory computer-readable medium storing a computer program for performing a method for gaming, the computer-readable medium comprising:
program instructions for generating game state data during execution of a video game for a game play of a player;
program instructions for determining a gaming context of a current point in the game play based on the game state data;
program instructions for providing as input the game state data and the gaming context to an artificial intelligence (AI) model trained to identify one or more levels of user immersion defining user engagement with the video game;
program instructions for using the AI model to determine a level of user immersion for gaming for the current point in the game play, wherein the level of immersion exceeds a threshold indicating that the player is highly engaged with the video game, wherein the threshold is determined based on a skill level of the player and the gaming context; and
program instructions for automatically generating an indicator that is presented to a physical environment surrounding the player, wherein the indicator provides notification that the player should not be interrupted.

9. The non-transitory computer-readable medium of claim 8, further comprising:

program instructions for collecting a plurality of game state data during a plurality of game plays of the player playing one or more video games; and program instructions for training the AI model based on the plurality of game state data to identify the one or more levels of user immersion of the player.

10. The non-transitory computer-readable medium of claim 9, further comprising:

program instructions for collecting biometric data related to the player during the plurality of game plays; and program instructions for training the AI model based on the biometric data.

11. The non-transitory computer-readable medium of claim 8, further comprising:

program instructions for providing as the indicator a light cue on a head mounted display (HMD) worn by the player.

12. The non-transitory computer-readable medium of claim 8, further comprising:

program instructions for providing as the indicator an audio notification.

13. The non-transitory computer-readable medium of claim 8, further comprising:

program instructions for providing as the indicator a light cue on a controller used by the player to provide controller input directing the game play of the player.

14. The non-transitory computer-readable medium of claim 8, further comprising:

program instructions for providing feedback to the AI model verifying whether the level of user immersion exceeds the threshold.

15. A computer system comprising:

a processor;

memory coupled to the processor and having stored therein instructions that, if executed by the computer system, cause the computer system to execute a method for gaming, comprising:

generating game state data during execution of a video game for a game play of a player;

determining a gaming context of a current point in the game play based on the game state data;

providing as input the game state data and the gaming context to an artificial intelligence (AI) model trained to identify one or more levels of user immersion defining user engagement with the video game;

using the AI model to determine a level of user immersion for gaming for the current point in the game play, wherein the level of immersion exceeds a threshold indicating that the player is highly engaged with the video game, wherein the threshold is determined based on a skill level of the player and the gaming context; and automatically generating an indicator that is presented to a physical environment surrounding the player, wherein the indicator provides notification that the player should not be interrupted.

16. The computer system of claim 15, the method further comprising:

collecting a plurality of game state data during a plurality of game plays of the player playing one or more video games; and training the AI model based on the plurality of game state data to identify the one or more levels of user immersion of the player.

17. The computer system of claim 16, the method further comprising:

collecting biometric data related to the player during the plurality of game plays; and training the AI model based on the biometric data.

18. The computer system of claim 15, the method further comprising:

providing as the indicator a light cue on a head mounted display (HMD) worn by the player.

19. The computer system of claim 15, the method further comprising:

providing as the indicator a light cue on a controller used by the player to provide controller input directing the game play of the player.

20. The computer system of claim 15, the method further comprising:

providing feedback to the AI model verifying whether the level of user immersion exceeds the threshold.

* * * * *